United States Patent
Sariel et al.

(10) Patent No.: US 12,135,633 B2
(45) Date of Patent: Nov. 5, 2024

(54) SOURCE-LEVEL DEBUGGING OF INTERMEDIATE CODE

(71) Applicant: RED HAT, INC., Raleigh, NC (US)

(72) Inventors: David Sariel, Holon (IL); Arie Bregman, Yan Gavne (IL)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/699,023

(22) Filed: Mar. 18, 2022

(65) Prior Publication Data

US 2023/0297491 A1  Sep. 21, 2023

(51) Int. Cl.
*G06F 11/36* (2006.01)
*G06F 8/73* (2018.01)

(52) U.S. Cl.
CPC .......... *G06F 11/3624* (2013.01); *G06F 8/73* (2013.01); *G06F 11/366* (2013.01); *G06F 11/3664* (2013.01)

(58) Field of Classification Search
USPC ................................................ 717/124–135
See application file for complete search history.

(56) References Cited

U.S. PATENT DOCUMENTS

| | | | |
|---|---|---|---|
| 5,187,789 A * | 2/1993 | O'Hair | G06F 8/20 714/E11.21 |
| 7,240,303 B1 | 7/2007 | Schubert | |
| 7,607,123 B2 | 10/2009 | Chavan | |
| 8,935,673 B1 | 1/2015 | Ashkenazi et al. | |
| 9,632,771 B2 | 4/2017 | Toub | |
| 10,528,458 B2 | 1/2020 | Brafman et al. | |
| 10,810,007 B2 | 10/2020 | Baars et al. | |
| 2003/0196188 A1 * | 10/2003 | Kuzmin | G06F 11/3676 717/124 |
| 2007/0277165 A1 * | 11/2007 | Stall | G06F 11/3624 717/146 |

(Continued)

OTHER PUBLICATIONS

Cook, et al., "Finding Bugs in Source Code Using Commonly Available Development Metadata." https://www.usenix.org/system/files/conference/cset15/cset15-cook.pdf, 8 pages. Aug. 10, 2015.

(Continued)

*Primary Examiner* — Andrew M. Lyons
(74) *Attorney, Agent, or Firm* — Dority & Manning, P.A.

(57) ABSTRACT

An example method may include identifying one or more source code lines from which an intermediate code line of an intermediate code module is generated, wherein each respective source code line is associated with a respective source code module name and further associated with a respective line number in the respective source code module, generating one or more source mappings, where each source mapping corresponds to a respective source code line and associates a line number of the intermediate code line with a respective source code module name of the respective source code line and further with a respective line number of the respective source code line, and storing, in a data store, the one or more source mappings in association with a name of the intermediate code module. The intermediate code module can be a file generated by a compiler or translator.

20 Claims, 7 Drawing Sheets

(56) References Cited

U.S. PATENT DOCUMENTS

| | | | |
|---|---|---|---|
| 2012/0159444 A1* | 6/2012 | Agarwal | G06F 11/3624 |
| | | | 717/124 |
| 2014/0289707 A1* | 9/2014 | Guan | G06F 11/3624 |
| | | | 717/124 |
| 2015/0331701 A1* | 11/2015 | Man | G06F 9/45525 |
| | | | 717/148 |
| 2019/0042395 A1* | 2/2019 | Tian | G06F 11/3612 |
| 2021/0279553 A1* | 9/2021 | Zhu | G06N 3/105 |

OTHER PUBLICATIONS

ADL Enterprise Learner Record Repository Systems Integration Plan. https://apps.dtic.mil/sti/pdfs/AD1141223.pdf. May 11, 2021, 36 pages.

Debugging CI/CD Pipeline Steps. https://medium.com/it-dead-inside/debugging-ci-cd-pipeline-steps-d4747c4e94be. 13 Pages, dated Oct. 7, 2019.

* cited by examiner

SOURCE-LEVEL DEBUGGING OF INTERMEDIATE CODE

TECHNICAL FIELD

The present disclosure is generally related to debugging in a computing environment, and more particularly, to source-level debugging of intermediate code.

BACKGROUND

Debugging is a methodical process of finding and reducing the number of bugs, or defects, in a computer program, thus making it behave as expected. Debugging ranges in complexity from fixing simple errors to performing lengthy and tiresome tasks of data collection, analysis, and scheduling updates. The debugging skill of the programmer can be a major factor in the ability to debug a problem, but the difficulty of software debugging varies greatly with the complexity of the system, and also depends, to some extent, on the programming language(s) used and the available tools, such as debuggers. Debuggers are software tools which enable the programmer to monitor the execution of a program, stop it, restart it, set breakpoints, and change values in memory. More specifically, the debugger can be a computer program that is used to test and debug other programs, sometimes called target programs.

In computer program development, continuous integration is the practice of merging developer working copies of computer program code for an application into a shared mainline code base, generally, several times a day. Typically, with continuous integration, each computer program developer team member submits source code for the application being developed on a daily (or more frequent) basis, and a set of operations referred to herein as a build process ("build") is performed to produce executable code from the source code. The executable code may be for an application, for example. The set of operations for providing a build may include compiling source code files to produce the executable code for an application, performing tests on the executable code, and instating or deploying the executable code. The build process may be performed at periodic times, or with each significant source code change. Isolated source code changes can be tested as part of the build process when the source code is added to the larger mainline code base.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are systems and methods for source-level debugging of intermediate code. Source-level debugging features can be provided by a debugging system so that a human programmer can interact with an executing program at the source code level. "Source code" herein shall refer to statements in a particular high-level language. The high-level language can be a programming language, such as, for example. Java, Python, C, Groovy, or the like. The high-level language can also be a domain-specific language specialized to a particular application domain. Examples of domain-specific languages include Structured Query Language (SQL) for databases, grammar specification languages for creating parsers, Hypertext Markup Language (HTML) for creating Web pages, and so on. Source code in a particular programming language can be created by a programmer and compiled to form corresponding native instructions that are included in a target program. A debugger tool can enable the programmer to monitor execution of statements in the source code as the target program executes the corresponding native instructions.

Source code can be represented by one or more high-level programming language modules. A high-level programming language module can be provided by a text file including a plurality of statements in a high-level programming language representing one or more units of compilation, including, for example, declarations, functions, routines, and/or methods. Source code can be compiled by a compiler or other translator to generate native code executable by a processor, or intermediate code. The source code that is provided to the compiler is referred to herein as "initial source code." The generated intermediate code can include instructions that can be compiled by another compiler or executed by an interpreter, for example. The intermediate code can include statements in the same programming language as the initial source code, statements in a different programming language, or native code (e.g., executable instructions). Portions of the intermediate code that are not native code can be compiled (or interpreted) to produce native code or other intermediate code.

Existing debugging systems provide source-level debugging that can be used to debug the target program. However, existing debugging systems present the intermediate code, e.g., enable the programmer to view and step through the intermediate code. However, the generated intermediate code can differ substantially from the initial source code, and can be difficult or time consuming for a human programmer to understand and debug. Further, any changes to fix bugs or defects should be made to the initial source code, since the intermediate code is ordinarily temporary in nature and is likely to be overwritten each time the initial source code is compiled. Thus, even if the programmer understands the intermediate code and identifies a statement on a particular line of the intermediate code to change, the programmer may also have to find the initial source code file from which the intermediate code is generated, and determine which line of the initial source code file corresponds to the intermediate code. If the intermediate code is generated from multiple initial source files, then the programmer also has to determine which of the initial source code files corresponds to the particular line of the intermediate code.

Aspects of the present disclosure address the above and other deficiencies by providing a debugging system that presents initial source code that corresponds to each line of intermediate code presented by a debugger tool. The initial source code can be one or more lines of program code statements written by a programmer in a high-level or domain-specific language that is compiled to the intermediate code using a first compiler or translator. The intermediate code can be in another high-level language, for example. A code generator used by the compiler can generate a mapping between lines of the initial source code and lines of the intermediate code. The code generator can store the mapping in a database, file, or other suitable data store. The intermediate code can be compiled to native code, which can be included in a target program. A debugger tool can be used to execute the executable code of the target program under the control of a programmer or other user. Debugging may involve executing at least a part of the executable code from a current position until a next active breakpoint or, in a step-by-step mode, until the next high-level language statement. The debugger tool may display the current position within the source code, intermediate representation, and/or executable module. The debugger tool may also display the current values stored in registers and memory variables. The debugger tool can present lines of the intermediate code that correspond to the native code of the target program as the target program executes.

The debugger tool can access the mapping stored in the data store and use the mapping to present the initial source code that corresponds to a line of intermediate code presented by the debugger tool. Thus, for each line of intermediate code presented, or in response to particular events, such as reaching a breakpoint, stepping to a next instruction, or otherwise stopping execution of the intermediate code and/or waiting for user input, the debugger tool can use the mapping to identify and present one or more lines of the initial source code that correspond to the line of intermediate code. The lines of initial source code can be lines of one or more initial source code files that were compiled to generate the line of intermediate code. Thus, the user of the debugger tool can see the lines of initial source code from which each line of intermediate code was generated. For example, the mapping can be represented as a mapping table data structure that includes a list of mapping table entries. Each mapping table entry can specify an intermediate code line number that identifies a line of intermediate code, and an initial source code line number that identifies a line of initial source code from which the line of intermediate code was generated. To identify the line of initial source code that corresponds to a particular line number of intermediate code, e.g., so that the line of initial source code can be presented, the debugger tool can search the mapping table for a mapping table entry specifying an intermediate code line number that matches the particular line number. If such an entry is found, then the corresponding line of initial source code is identified by the initial source code line number specified by the entry. The debugger tool can present the identified line of initial source code, e.g., by displaying the initial source code file in a window or other display area, and emphasizing, e.g., displaying an indicator next to, the identified line of the initial source code file in the window. For example, when a breakpoint is reached in the intermediate code, the initial source code that was used to generate the intermediate code can be displayed in a window located on the right or left side of a window in which the intermediate code is displayed. The identified line of initial source code can be displayed adjacent or otherwise in association with a breakpoint indicator, such as a symbol that represents a breakpoint. The breakpoint indicator indicates that the identified line of initial source code was used to generate the line of intermediate code for which the breakpoint was reached.

The intermediate code can also be generated from a plurality of initial source code files, so the code generator can also generate a mapping between each line of the initial source code, an initial source code file, and an initial source line number. For example, line 5 of an intermediate code file was generated from line 10 of a file named "FileA" and also from line 15 of a file named "FileB" then the generated mapping can be (5, FileA, 10) and (5, FileB, 15). The debugger tool can identify the lines of initial source code that correspond to a particular line of intermediate code by searching the mapping table for each mapping table entry specifying an intermediate code line number that matches the line number of the particular line of intermediate code. Each such an entry that is found specifies a file name and line number in the file at which one of the corresponding lines of initial source code is located. The debugger tool can present the identified lines of initial source code, e.g., by displaying each identified initial source code file in a separate window and emphasizing, e.g., by displaying an indicator next to, the identified line of each initial source file code in each window. For example, when a breakpoint is reached in the intermediate code, the each of the identified lines of initial source code used to generate the intermediate code can be displayed in a respective window located on the right or left side of a window in which the intermediate code is displayed. Each of the identified lines of initial source code can be displayed adjacent or otherwise in association with a breakpoint indicator, such as a symbol that represents a breakpoint.

As an example, a continuous software integration/continuous software delivery (CI/CD) system can execute build pipelines that perform operations such as generating target programs from source files and performing automated tests. Instructions specifying how to perform the pipeline operations can be provided to the CI/CD system in the form of pipeline definition files, such as program code in a high-level language, build scripts in a domain-specific high-level language, or declarative descriptions of build dependencies. The pipeline definition files are examples of input source files. Each pipeline definition is translated by the CI/CD system to pipeline entity code, which is an example of an intermediate file. The CI/CD system can compiling the pipeline entity code to form a pipeline program. To debug incorrect behavior in the build pipeline, a user can use a debugger tool to execute the pipeline program in a step-by-step mode. The debugger tool presents lines of the pipeline entity code as the pipeline program executes. However, the pipeline entity code is substantially different from the pipeline definition files. Thus, the debugging system disclosed herein can generate a mapping from each line of the pipeline entity code to one or more corresponding pipeline definition file lines. The mapping can be stored at a CI/CD server for the particular pipeline, e.g., in a database or executable pipeline program file in a format such as ELF or DWARF. The CI/CD server can run the executable pipeline program in a step-by-step debugging mode by invoking a debugger tool that reads the mapping from the database or executable program file. The debugger tool displays lines of the pipeline entity code as the executable pipeline program executes, e.g., in the step-by-step debugging mode, or when a breakpoint is reached.

The systems and methods described herein include technical improvements to virtualization technology. In particular, aspects of the present disclosure may enable a debugger tool to display the source code from which a particular portion of intermediate code was generated. A particular line of an intermediate code file may have been generated from lines of multiple different initial source code files that contributed to generation of the intermediate code in the intermediate code file. Identifying those contributing lines in the multiple different initial source code files can be a difficult and time-consuming task for a user of the debugger tool to perform independently. The systems and methods described herein can display each contributing initial source code file, and indicate the particular line of each source code file that contributed to generating the particular line of the intermediate code file. Displaying each contributing initial source code file and line can assist the user to better understand the intermediate code, since the initial source code is ordinarily more meaningful and readable than the intermediate code. Further, displaying each contributing initial source code file and line is useful because any changes that may be needed to correct bugs or defects should be made to the initial source code file instead of the intermediate code file. The intermediate code file is likely to be replaced by a subsequent compilation or translation of the initial source code, so any changes should be made to the corresponding initial source code file(s). The corresponding initial source code file(s) can thus be readily identified by a user of the debugging system that includes the systems and methods disclosed herein.

The systems and methods described herein may be implemented by hardware (e.g., general purpose and/or specialized processing devices, and/or other devices and associated circuitry), software (e.g., instructions executable by a processing device), or a combination thereof. Various aspects of the above referenced methods and systems are described in details herein below by way of examples, rather than by way of limitation.

Figure 1:
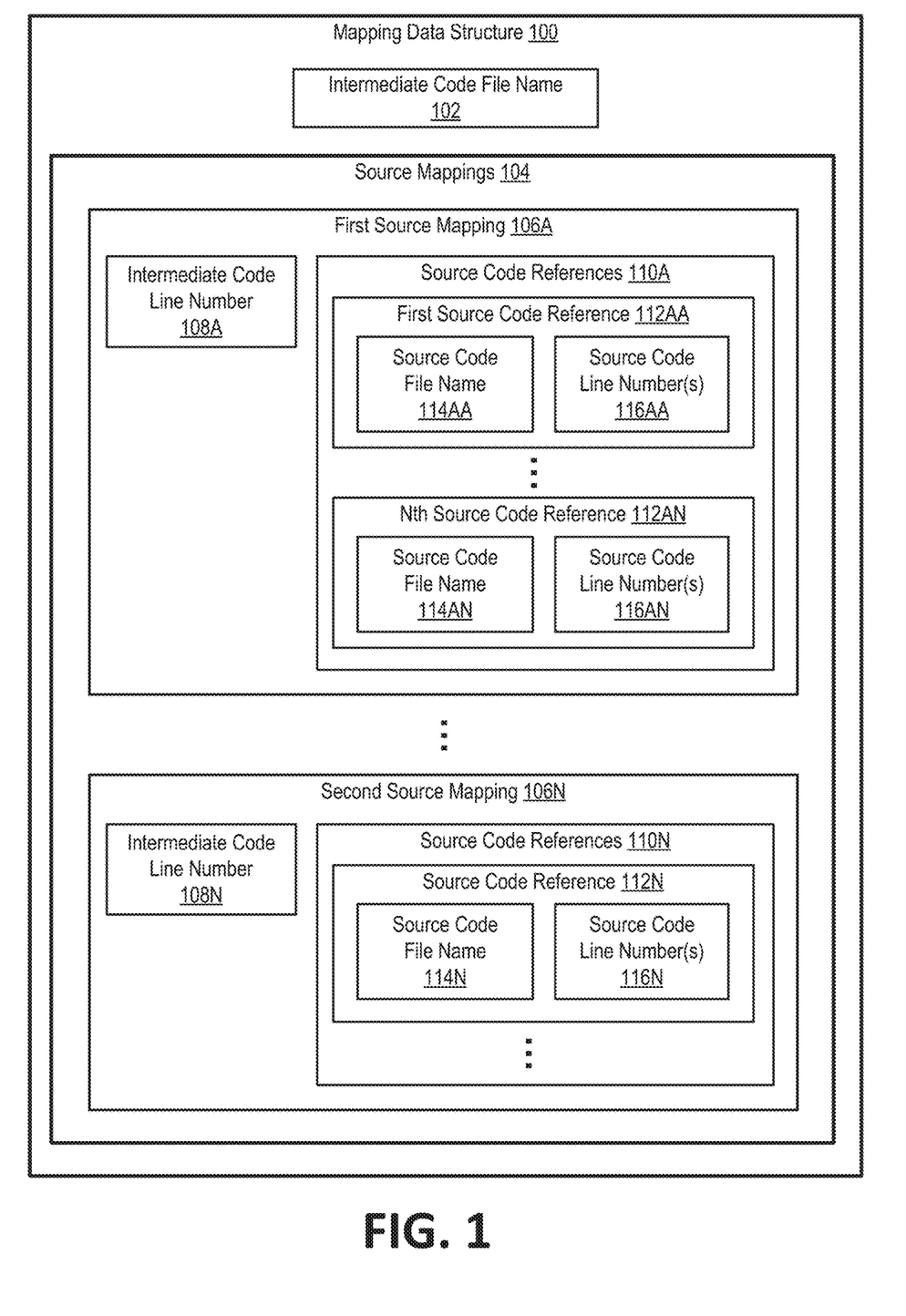
FIG. 1 depicts a block diagram of an example data structure that maps each line of an intermediate code file to one or more corresponding source code file lines, in accordance with one or more aspects of the present disclosure.
Figure 3:
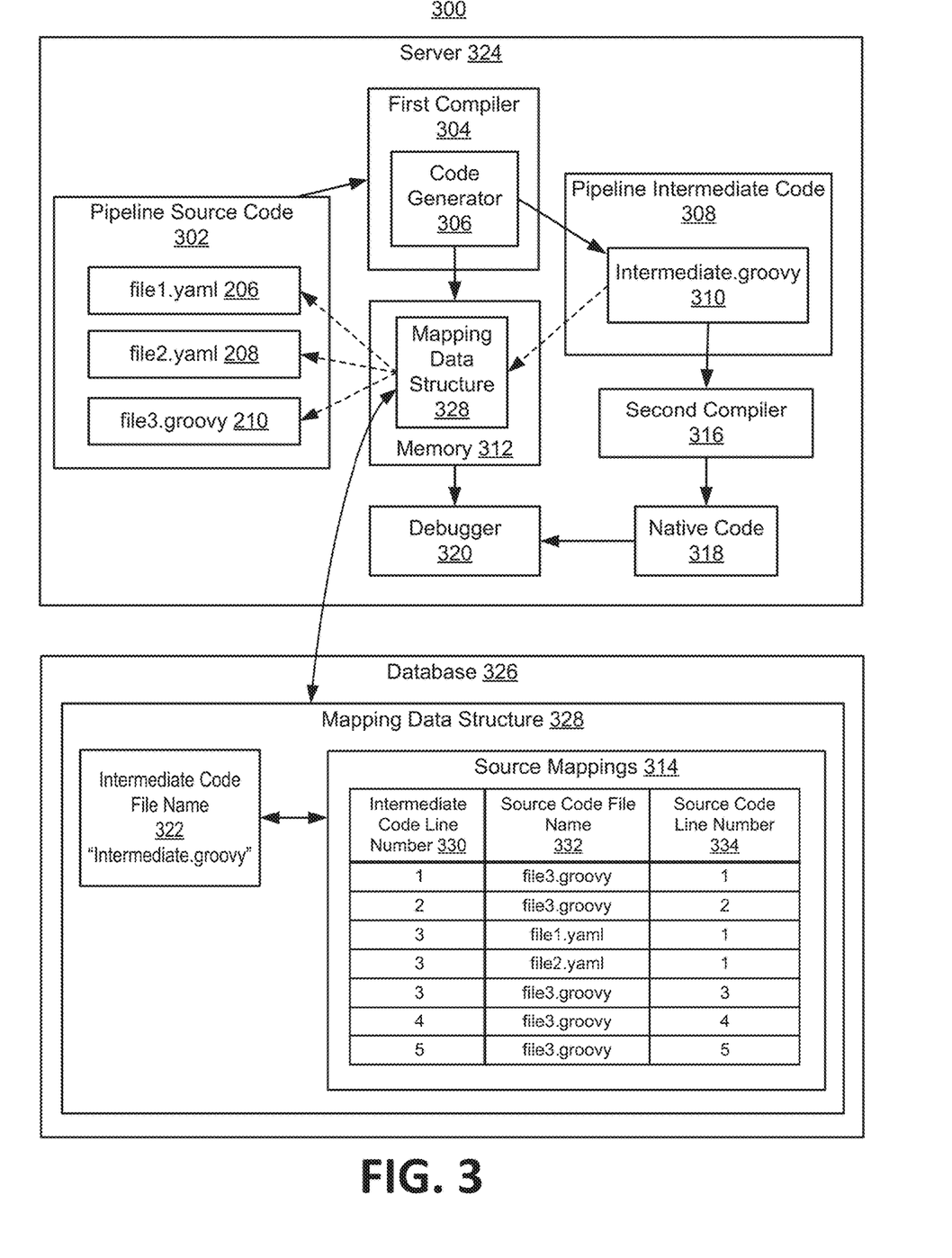
FIG. 3 depicts a block diagram of an example mapping in a continuous software integration environment between pipeline intermediate code and pipeline source code, in accordance with one or more aspects of the present disclosure.

FIG. 1 depicts a block diagram of an example data structure 100 that maps each line of an intermediate code file to one or more corresponding source code file lines, in accordance with one or more aspects of the present disclosure. The mapping data structure 100 can be created by a compiler, stored in a memory of a server or in a database, and accessed by a debugger tool, as shown in FIG. 3. The mapping data structure 100 associates an intermediate code file name 102 with a set of one or more source mappings 104. The example set of source mappings 104 includes a first source mapping 106A and a second source mapping 106N. Each source mapping 106 specifies an association between an intermediate code line number 108 and a source code reference set 110 containing one or more source code references 112. Each source code reference 112 specifies a source code file name 114 and one or more source code line numbers 116. As an example, an intermediate file named IntermediateFile.groovy can be generated by compiling three source code files named file1.yaml, file2.yaml, and file3.groovy. In this example, line 3 of the file IntermediateFile.groovy is generated (e.g., by a compiler) from three source code lines, which are line 1 of file1.yaml, line 1 of file2.yaml, and line 3 of file3.groovy. Thus, the intermediate code file name 102 is IntermediateFile.groovy, and the source mappings 104 can include a first source mapping 106A having an intermediate code line number 108A of "3" and three example source code references 112. The three example source code references 112 include a first source code reference 112AA (having a source code file name 114AA of "file1.yaml" and a source code line number 116AA of "1"), a second source code reference 112AB (not shown, having a source code file name 114AB of "file2.yaml" and a source code line number 116AB of "1"), and a third source code reference 112AN (having a source code file name 114AN of "file3.groovy" and a source code line number 116AN of "3").

As a further example, if line 5 of IntermediateFile.groovy is generated from line 5 of file3.groovy, then the source mappings 104 can include a second source mapping 106N having an intermediate code line umber 108N of "5" and a source code reference set 110N containing a source code reference 112N (having a source code file name 114AA of "file3.groovy" and a source code line number 116N of "5").

Figure 2:
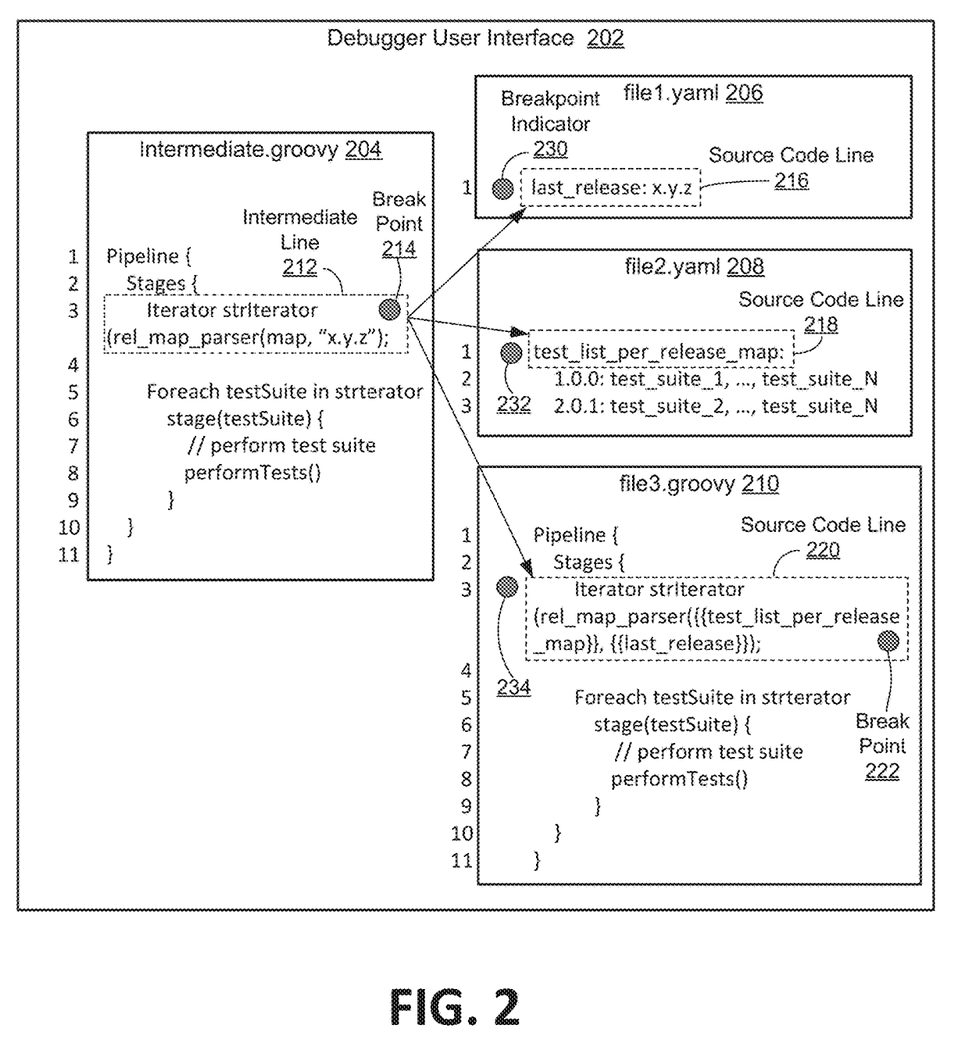
FIG. 2 depicts an example debugger user interface showing an intermediate code line of an intermediate code file that is being debugged and also showing corresponding lines of source code files from which the intermediate code line was generated, in accordance with one or more aspects of the present disclosure.

FIG. 2 depicts an example debugger user interface 202 showing an intermediate code line 212 of intermediate code 204 that is being debugged and also showing corresponding lines 216, 218, 220 of source code files 206, 208, 210 from which the intermediate code line 212 was generated, in accordance with one or more aspects of the present disclosure. The intermediate code 204 can be stored in an intermediate code file named "Intermediate.groovy," for example. The debugger user interface 202 enables the user to control a debugger tool that can start, pause, and resume execution of the intermediate code. The debugger user interface 202 can enable the user to set an intermediate code breakpoint 214 on a specified line 212 of the intermediate code. Execution of the intermediate code can stop when the specified line 212 is the next line to be executed.

The debugger user interface 202 can display source code files 206, 208, 210 from which a particular line 212 of the intermediate code 204 was generated. The debugger user interface 202 can display the source code files in response to an execution of the intermediate code 204 reaching the intermediate line 212, e.g., when the intermediate code breakpoint 214 is reached, or when step-by-step execution of the intermediate code 204 reaches the intermediate line 212. The debugger user interface 202 can display the source code files in response to other events, e.g., in response to a user request to display the source code from which the intermediate code 204 was generated, or in response to a user selecting the intermediate line 212, e.g., by clicking on the intermediate line 212. The debugger user interface 202 can highlight, emphasize, or otherwise indicate the particular source code file line(s) from which the intermediate code 204 was generated. For example, the debugger user interface 202 can display breakpoint indicators 230, 232, 234, e.g., symbols that represent breakpoints, adjacent to each respective source code line 216, 218, 220 from which the intermediate code 204 was generated. Alternatively or additionally, the debugger user interface 202 can highlight each source code line 216, 228, 220 using a color that contrasts with a background color of the debugger user interface 202, and/or display a border around each source code line 216, 228, 220, as shown in FIG. 2.

The debugger user interface 202 can query a mapping data structure 100 to identify the source code lines 216, 218, 220 of source code files 206, 208, 210 from which the intermediate code line 212 was generated. For example, if execution of the intermediate code 204 stops at the intermediate line 212 (e.g., line 3 of the file Intermediate.groovy), then the debugger can request the names of the source code file(s) and the line numbers of the particular lines in the source code file(s) from which the intermediate line 212 was generated. In this example, the mapping data structure 100 contains the source mappings 104 described above with respect to FIG. 1, so the debugger can determine, from the mappings, that the intermediate line 212 was generated from source code line 216 (line 1) of file file1.yaml 206, source code line 218 (line 1) of file2.yaml 208, and source code line 220 (line 3) of file3.groovy 210. The debugger user interface 202 can present the source lines from which the intermediate code 204 was generated by highlighting, emphasizing, or otherwise indicating the source lines in respective areas of the debugger user interface 202 in which the respective source code files 206, 208, 210 are displayed. The respective areas can be, for example, text display components such as text boxes, text windows, or other suitable user interface components.

The debugger user interface 202 can present one or more user interface features that form a graphical representation of an association between the intermediate code area (e.g., the area of the user interface in which the intermediate code 204 is displayed), and each of the source code areas of the user interface (e.g., the areas in which the source code files 206, 208, 210 are displayed). The graphical representation of the association can be, for example, a set of one or more lines or arrows, each of which connects the intermediate line 212 to one of the source code lines 216, 218, 220 from which the intermediate line 212 was generated. Three such arrows are shown in FIG. 2. Alternatively or additionally, the debugger user interface 202 can display the graphical representation of the association by displaying a portion of each file 206, 208, 210 that includes the respective source code line 216, 218, 220 adjacent to or within a threshold distance of the intermediate code 204.

The debugger user interface 202 can enable a user to set a source code breakpoint 222 on a source code line, such as source code line 216, source code line 218, or source code line 220. For example, the source code breakpoint 222 is set on source code line 220 of file3.groovy 210. The debugger user interface 202 can cause the debugger to set an intermediate code breakpoint 214 on the intermediate line 212 generated from the source code line 220 on which the source code breakpoint 222 has been set. The intermediate code breakpoint 214 thus corresponds to the intermediate code line 212 from which the source code line 220 was generated. Subsequent to setting the intermediate code breakpoint 214 that corresponds to the source code breakpoint 222, execution of the intermediate code 204 can stop at the intermediate line 212. Source code breakpoints can similarly be set on other lines of source code, such as source code line 216 of file1.yaml 206 or source code line 218 of file2.yaml 208, to cause execution of the intermediate code 204 to stop at a line generated from the other lines of source code.

To set a source code breakpoint 222 on a specified line of source code, the debugger user interface 202 can request that the debugger identify a particular intermediate code line from which the specified line of source code is generated. The request can specify a source code line number of the specified line of source code (e.g., line 3) and a specified source code file name of a source code file that includes the specified line of source code (e.g., file3.groovy). The debugger can retrieve, from a data store, a source mapping that includes the specified respective source code file name and the specified source code line number, and is associated in the data store with a name of an intermediate code file (e.g., Intermediate.groovy). The retrieved source mapping associates the specified source code file name and the specified source code line number with a line number of an intermediate code line. The debugger can provide the name of the intermediate code file and the line number of the intermediate code line in response to the request. The debugger user interface 202 can then set an intermediate code breakpoint 214 on the provided line number of the named intermediate code file. Alternatively or additionally, the debugger can set the intermediate code breakpoint 214, in which case the debugger user interface 202 need not set the intermediate code breakpoint 214.

FIG. 3 depicts a block diagram of an example mapping 328 in a continuous software integration and delivery environment ("CI/CD environment") 300 between pipeline intermediate code 308 and pipeline source code 302, in accordance with one or more aspects of the present disclosure. The CI/CD environment 300 can include a server 324 and a database 326. A first compiler 304 running on the server 324 can translate pipeline source code 302 to pipeline intermediate code 308. The pipeline source code 302 includes files file1.yaml 206, file2.yaml 208, and file3.groovy 210, which the compiler translates to an intermediate code file Intermediate.groovy 308. A component of the first compiler 304, such as a code generator 306, creates or updates a mapping data structure 328, which can be stored in a memory 312 of the server 324.

The intermediate code 310 can be compiled by a second compiler 316 to generate native code 318, which can be executed by a processing device. A debugger tool 320 can also execute the native code 318 in a debugging session to debug the intermediate code 310. The debugger tool 320 can retrieve the mapping data structure 328 from memory 312 or from database 326 and use the mapping data structure 328 to identify the intermediate file name 322 and source code line number 334 from which a specified intermediate code line 330 was generated. This mapping can be used to present the source code line number 334 of each source code line that contributes to the intermediate code 204, as described above.

Alternatively or additionally, the debugger tool 320 can use the mapping data structure 328 to identify the intermediate code line number 330 generated from a specified source code line number 334 of a specified source code file name 332. The latter mapping can be use, for example, to set a source code breakpoint 222, as described above, or to present the intermediate code line generated from a specified source code line.

The mapping data structure 328 can be created or updated by the first compiler 304. Since the first compiler 304 translates the source code files 206, 208, 210 to the intermediate code 204, the first compiler 304, or a component thereof, such as a code generator 306, has mapping information that associates each intermediate line 212 with the corresponding source code lines 216, 218, 220 and respective source code files 206, 208, 210. For each intermediate code line 212, the first compiler 304 can identify one or more source code lines from which the intermediate code line 212 is generated. Note that each respective source code line is contained in a respective source code file and identified by a respective line number in the respective source code file. The first compiler 304 (or a component thereof, such as the code generator 306) can generate source mappings 314 using the mapping information described above. Each source mapping 314 corresponds to a respective source code line and associates a line number of the intermediate code line with a respective source code file name of the respective source code line and further with a respective line number of the respective source code line. The first compiler 304 can then store, in a database 326, each of the generated source mappings 314 in association with a name of the intermediate code file 322 (e.g., "Intermediate.groovy").

The mapping data structure 328 includes an association between an intermediate file name 322 and a source mapping 314. The source mapping 314 can be represented as a table having a columns for the intermediate code line number 330, the source code file name 332, and the source code line number 334. For example, the source mapping 314 includes a first row specifying that an intermediate code line number "1" is generated from line 1 of a source code file named file3.groovy. The source mapping 314 includes a second row specifying that an intermediate code line number "2" is generated from line 2 of the source code file named file2.groovy. The source mapping 314 includes a third row specifying that an intermediate code line number "3" is generated from line 1 of the source code file named file1.yaml, a fourth row specifying that the intermediate code line number "3" is also generated from line 1 of the source code file named file2.yaml, a firth row specifying that the intermediate code line number "3" is also generated from line 3 of file3.groovy.

The debugger tool 320 can, in response to receiving a request to present an intermediate code line 212 of an intermediate code file 204 in a user interface 202, identify and present one or more source code lines from which the intermediate line 212 was generated. To identify and present the one or more source code lines, the debugger tool 320 can retrieve, from a data store, one or more source mappings stored in association with a name of the intermediate code file. Each of the retrieved source mappings includes a respective intermediate code line number, a respective source code file name, and a respective line number of a respective source code line. The debugger tool 320 can present a portion of the intermediate code file in an intermediate code area of the user interface, such that the portion of the intermediate code file includes the intermediate code line. The debugger tool 320 can also present one or more source code areas in the user interface. Each source code area corresponds to one of the retrieved source mappings and displays a respective portion of a respective source code file identified by the respective source code file name. The respective portion of the respective source code file can include the respective source code line identified by the respective line number.

Figure 4:
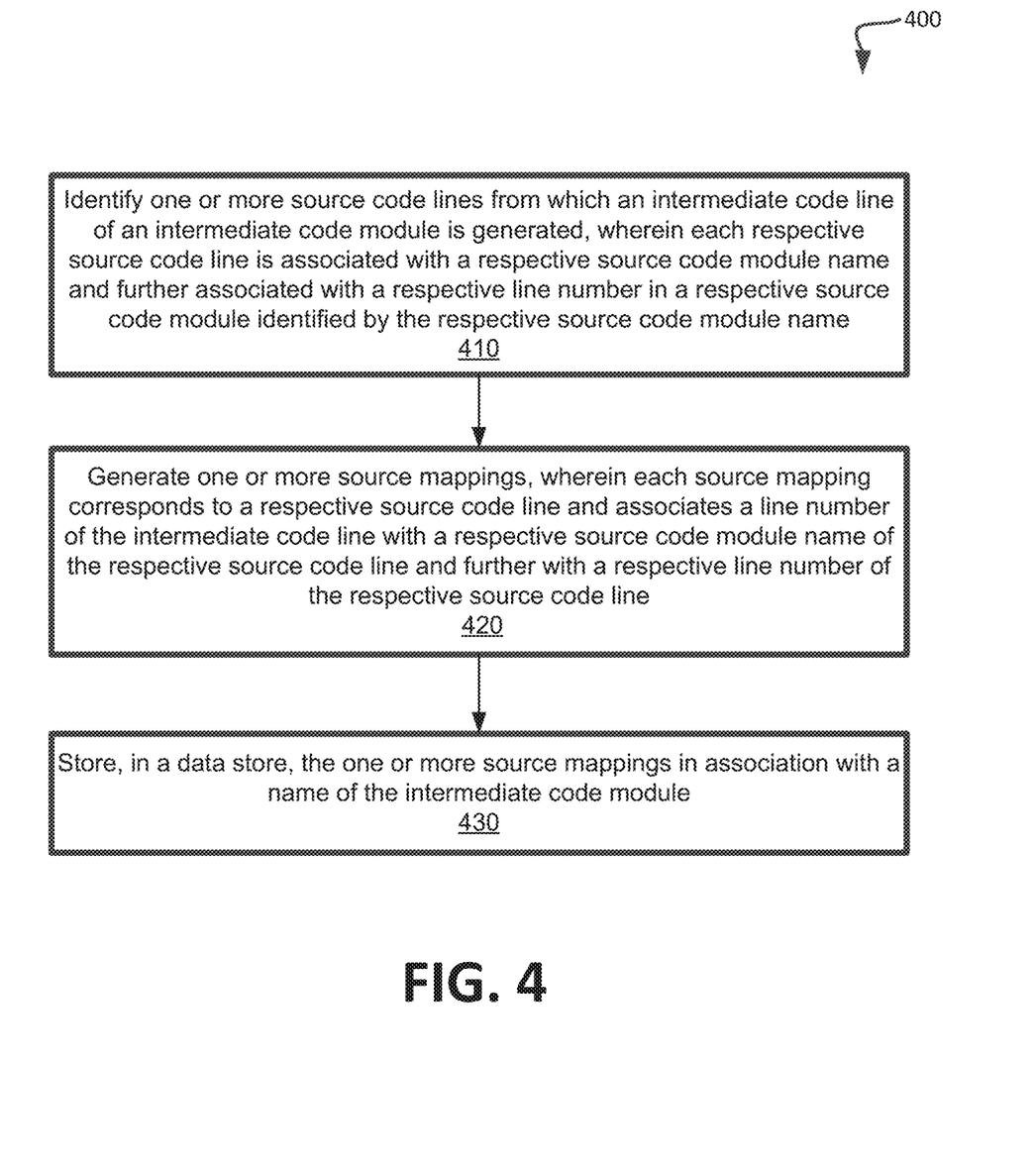
FIG. 4 depicts a flow diagram of an example method for generating debugging information that maps each line of intermediate code to one or more corresponding source code lines, in accordance with one or more aspects of the present disclosure.

FIG. 4 depicts a flow diagram of an example method 400 for generating debugging information that maps each line of intermediate code to one or more corresponding source code lines, in accordance with one or more aspects of the present disclosure. Method 400 and each of its individual functions, routines, subroutines, or operations may be performed by one or more processors of the computer device executing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processes implementing method 400 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by a first compiler 304 as shown in FIG. 1 or by an executable code of a host machine (e.g., host operating system or firmware), a virtual machine (e.g., guest operating system or virtual firmware), an external device (e.g., a PCI device), other executable code, or a combination thereof.

Method 400 may be performed by processing devices of a server device or a client device and may begin at block 410. At block 410, a host computer system 100 may identify one or more source code lines from which an intermediate code line of an intermediate code module is generated, wherein each respective source code line is associated with a respective source code module name and further associated with a respective line number in the respective source code module. The intermediate code module may be generated by a compiler or translator by compiling or translating each of the respective source code modules, for example. Each respective line number and each respective source code module name may be provided by a compiler 304 or translator, e.g., by a code generator 306 of the compiler 304.

At block 420, the host computer system may generate one or more source mappings, wherein each source mapping corresponds to a respective source code line and associates a line number of the intermediate code line with a respective source code module name of the respective source code line and further with a respective line number of the respective source code line. At block 430, the host computer system may store, in a data store, the one or more source mappings in association with a name of the intermediate code module. Responsive to completing the operations described herein above with reference to block 430, the method may terminate.

Figure 5:
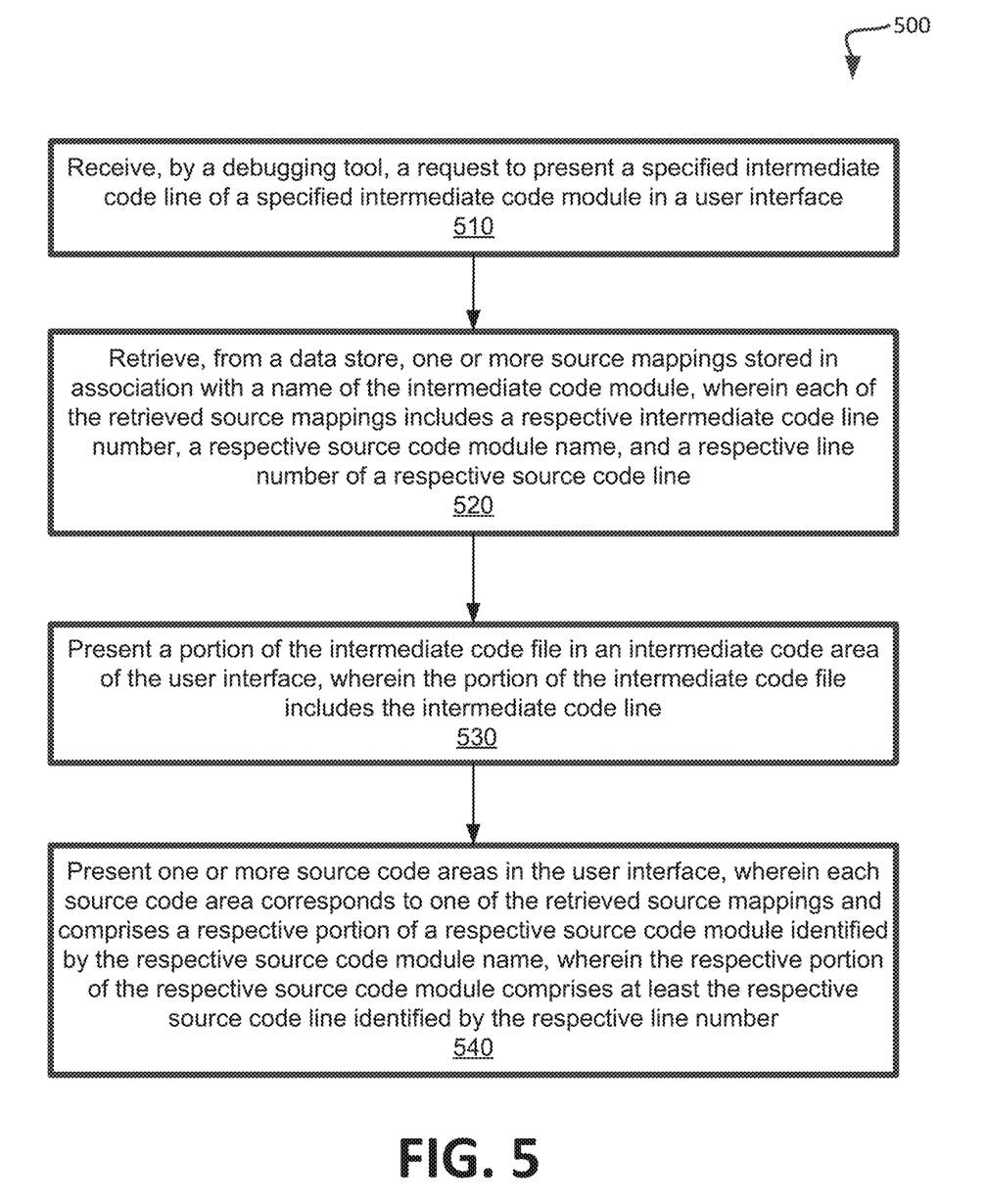
FIG. 5 depicts a flow diagram of an example method for identifying one or more source code lines for each line of intermediate code, in accordance with one or more aspects of the present disclosure.

FIG. 5 depicts a flow diagram of an example method 500 for identifying one or more source code lines for each line of intermediate code, in accordance with one or more aspects of the present disclosure. Method 500 and each of its individual functions, routines, subroutines, or operations may be performed by one or more processors of the computer device executing the method. In certain implementations, method 500 may be performed by a single processing thread. Alternatively, method 500 may be performed by two or more processing threads, each thread executing one or more individual functions, routines, subroutines, or operations of the method. In an illustrative example, the processing threads implementing method 500 may be synchronized (e.g., using semaphores, critical sections, and/or other thread synchronization mechanisms). Alternatively, the processes implementing method 500 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 500 may be performed by a debugger 320 as shown in FIG. 1 or by an executable code of a host machine (e.g., host operating system or firmware), a virtual machine (e.g., guest operating system or virtual firmware), an external device (e.g., a PCI device), other executable code, or a combination thereof.

Method 500 may be performed by processing devices of a server device or a client device and may begin at block 510. At block 510, a host computer system 100 may receive, by a debugger tool, a request to present a specified intermediate code line of a specified intermediate code module in a user interface.

At block 520, the host computer system may retrieve, from a data store, one or more source mappings stored in association with a name of the intermediate code module, wherein each of the retrieved source mappings includes a respective intermediate code line number, a respective source code module name, and a respective line number of a respective source code line. At block 530, the host computer system may present a portion of the intermediate code file in an intermediate code area of the user interface, wherein the portion of the intermediate code file includes the intermediate code line.

At block 540, the host computer system may present one or more source code areas in the user interface, wherein each source code area corresponds to one of the retrieved source mappings and comprises a respective portion of a respective source code module identified by the respective source code module name, wherein the respective portion of the respective source code module comprises at least the respective source code line identified by the respective line number. Responsive to completing the operations described herein above with reference to block 540, the method may terminate.

Figure 6:
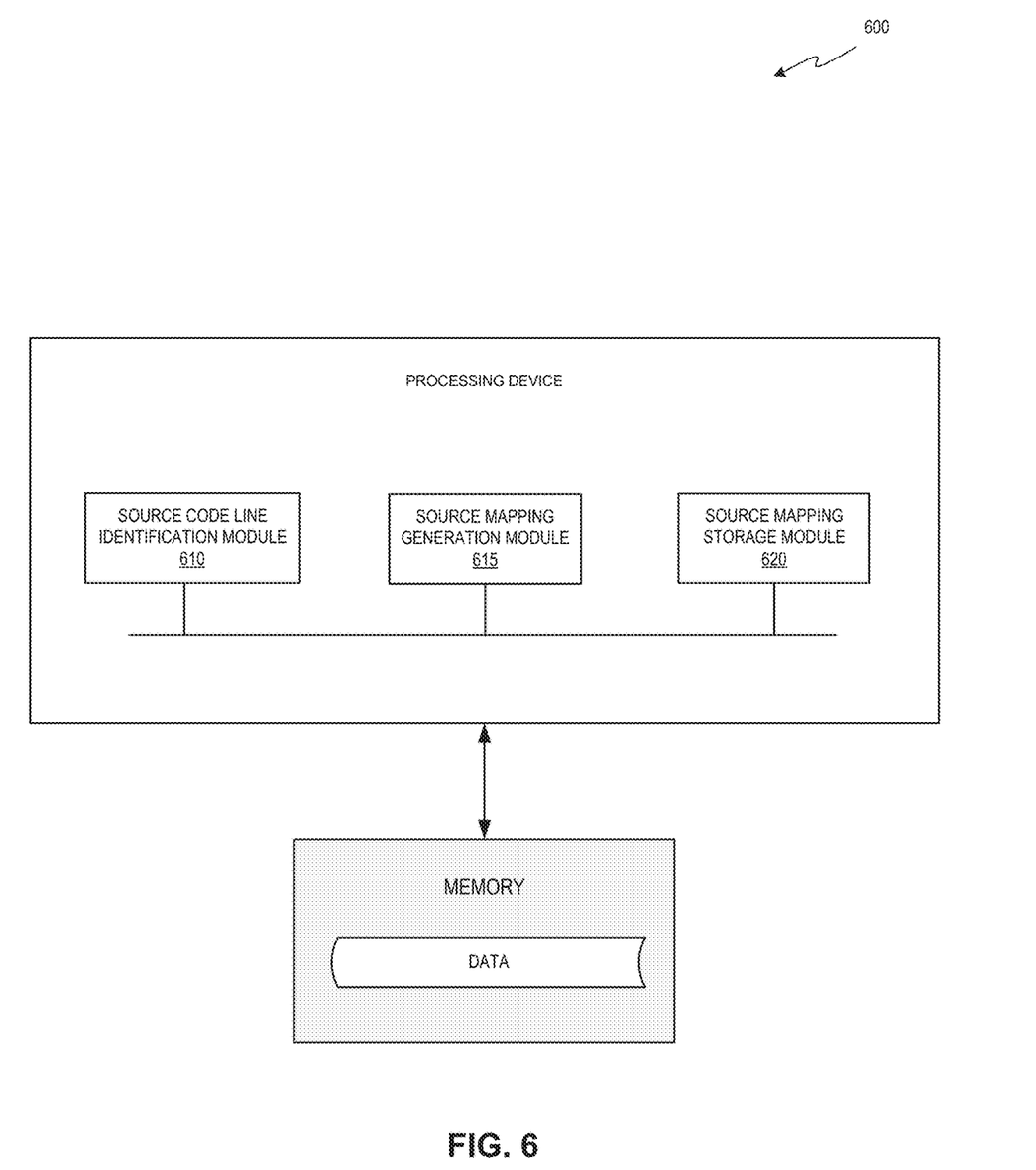
FIG. 6 depicts a block diagram of an example computer system in accordance with one or more aspects of the present disclosure.

FIG. 6 depicts a block diagram of a computer system 600 operating in accordance with one or more aspects of the present disclosure. Computer system 600 may be the same or similar to computing device 100 of FIG. 1, and may include one or more processors and one or more memory devices. In the example shown, computer system 600 may include a source code line identification module 610, a source mapping generation module 615, and a source mapping storage module 620.

Source code line identification module 610 may enable a processor to identify one or more source code lines from which an intermediate code line of an intermediate code module is generated, where each respective source code line is associated with a respective source code module name and further associated with a respective line number in the respective source code module. Source mapping generation module 615 may enable the processor to generate one or more source mappings, each of which corresponds to a respective source code line and associates a line number of the intermediate code line with a respective source code module name of the respective source code line and further with a respective line number of the respective source code line.

Source mapping storage module 620 may enable the processor to present one or more source code areas in the user interface, where each source code area corresponds to one of the retrieved source mappings and comprises a respective portion of a respective source code module identified by the respective source code module name, wherein the respective portion of the respective source code module comprises at least the respective source code line identified by the respective line number.

Figure 7:
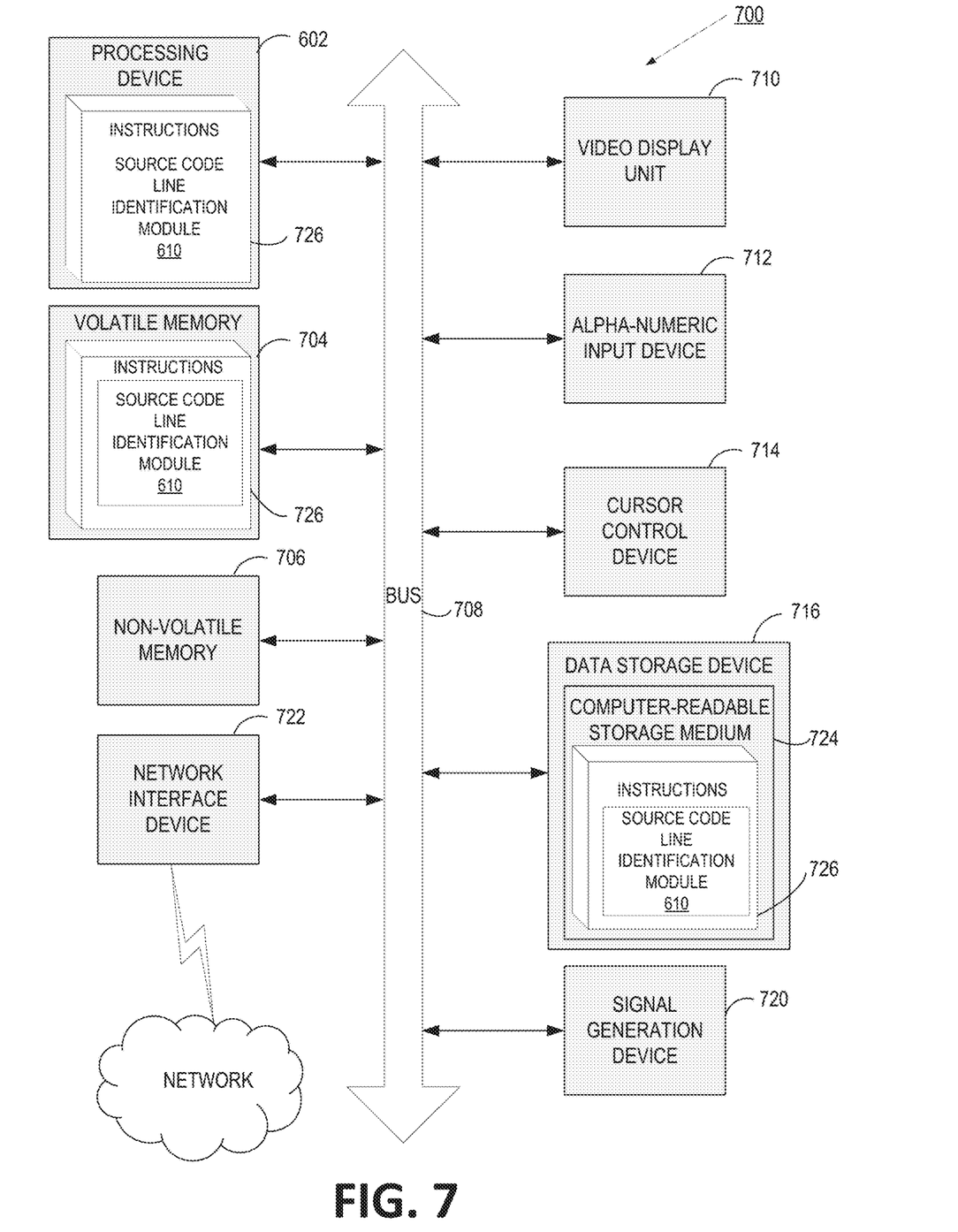
FIG. 7 depicts a block diagram of an illustrative computing device operating in accordance with the examples of the present disclosure.

FIG. 7 depicts a block diagram of a computer system operating in accordance with one or more aspects of the present disclosure. In various illustrative examples, computer system 700 may correspond to a computing system on which compiler 304 and debugger 320 of FIG. 3 can execute. Computer system 700 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical environment, but requests for a hard disk or memory may be managed by a virtualization layer of a computing device to translate these requests to the underlying physical computing hardware resources. This type of virtualization results in multiple VMs sharing physical resources.

In certain implementations, computer system 700 may be connected (e.g., via a network, such as a Local Area Network (LAN), an intranet, an extranet, or the Internet) to other computer systems. Computer system 700 may operate in the capacity of a server or a client computer in a client-server environment, or as a peer computer in a peer-to-peer or distributed network environment. Computer system 700 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 700 may include a processing device 702, a volatile memory 704 (e.g., random access memory (RAM)), a non-volatile memory 706 (e.g., read-only memory (ROM) or electrically-erasable programmable ROM (EEPROM)), and a data storage device 716, which may communicate with each other via a bus 708.

Processing device 702 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 700 may further include a network interface device 722. Computer system 700 also may include a video display unit 710 (e.g., an LCD), an alphanumeric input device 712 (e.g., a keyboard), a cursor control device 714 (e.g., a mouse), and a signal generation device 720.

Data storage device 716 may include a non-transitory computer-readable storage medium 724 on which may store instructions 726 encoding any one or more of the methods or functions described herein, including instructions for implementing method 400 or 500.

Instructions 726 may also reside, completely or partially, within volatile memory 704 and/or within processing device 702 during execution thereof by computer system 700, hence, volatile memory 704 and processing device 702 may also constitute machine-readable storage media.

While computer-readable storage medium 724 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "deriving," "encrypting," "creating," "generating," "using," "accessing," "executing," "obtaining," "storing," "transmitting," "providing," "establishing," "receiving," "identifying," "initiating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 400 or 500 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A system comprising:
a memory device; and
a processing device, operatively coupled to the memory device, to perform operations comprising:
identifying a plurality of pipeline definition file (PDF) lines from which a pipeline entity code (PEC) line of a PEC module is generated;
generating a plurality of source mappings for the PEC line, wherein each respective source mapping:
corresponds to a respective PDF line from which the PEC line is generated; and
associates the PEC line with the respective PDF line and a respective PDF module name of the respective PDF line; and
storing, in a data store, the plurality of source mappings in association with a name of the PEC module;
executing a pipeline program in a debugging session to debug the PEC module, wherein the pipeline program is compiled from the PEC module;
presenting the PEC line during executing the pipeline program in the debugging session;
retrieving, from the data store, the plurality of source mappings; and
presenting, based on the plurality of source mappings, the plurality of PDF lines in association with the PEC line.

2. The system of claim 1, wherein the plurality of PDF lines are respectively associated with a plurality of PDF modules, and wherein the PEC module is generated by a compiler or translator in view of the plurality of PDF modules.

3. The system of claim 1, wherein each respective PDF line is associated with a respective line number in a respective PDF module identified by the respective PDF module name, wherein each respective line number and each respective PDF module name are provided by a compiler or translator.

4. The system of claim 1, wherein each of the retrieved source mappings includes a respective PEC line number, a respective PDF module name, and a respective line number of a respective PDF line, the operations further comprising:

receiving, by a debugger tool, a request to present the PEC line in a user interface;

presenting a portion of a PEC file in a PEC area of the user interface, wherein the portion of the PEC file includes the PEC line; and presenting one or more PDF areas in the user interface, wherein each PDF area corresponds to one of the retrieved source mappings and comprises a respective portion of a respective PDF module identified by the respective PDF module name, wherein the respective portion of the respective PDF module comprises at least the respective PDF line identified by the respective line number.

5. The system of claim 4, wherein the request to present the PEC line is received in response to a command to display at least a portion of the PEC module that includes the PEC line in the user interface.

6. The system of claim 4, wherein the request to present the PEC line is received in response to execution of program code in the debugger tool reaching a breakpoint associated with the PEC line.

7. The system of claim 4, wherein the operations further comprise:

presenting one or more user interface features that comprise a graphical representation of an association between the PEC area and each of the PDF areas of the user interface.

8. The system of claim 4, wherein the PEC area is in a first text presentation component of the user interface, and each of the respective PDF areas is in a respective second text presentation component of the user interface.

9. The system of claim 1, wherein the operations further comprise:

receiving, by a debugger tool, a request to identify a particular PEC line from which a specified line of PDF is generated, wherein the request further specifies a PDF line number of the specified line of PDF and a specified PDF module name of a PDF module that includes the specified line of PDF;

retrieving a source mapping from the data store, the retrieved source mapping includes the specified respective PDF module name and the specified PDF line number, wherein the retrieved source mapping is associated in the data store with a name of a PEC module and associates the specified PDF module name and the specified PDF line number with a line number of a PEC line; and providing, in response to the request, the name of the PEC module and the line number of the PEC line.

10. The system of claim 9, wherein the request is associated with a command that sets a breakpoint on the specified line of PDF, and the operations further comprise:

setting a breakpoint on the PEC line identified by the line number in the PEC module identified by the name of the PEC module.

11. A method comprising:

identifying a plurality of pipeline definition file (PDF) lines from which a pipeline entity code (PEC) line of a PEC module is generated;

generating a plurality of source mappings for the PEC line, wherein each respective source mapping:

corresponds to a respective PDF line from which the PEC line is generated; and associates the PEC line with the respective PDF line and a respective PDF module name of the respective PDF line; and storing, in a data store, the plurality of source mappings in association with a name of the PEC module;

executing a pipeline program in a debugging session to debug the PEC module, wherein the pipeline program is compiled from the PEC module;

presenting the PEC line during executing the pipeline program in the debugging session;

retrieving, from the data store, the plurality of source mappings; and presenting, based on the plurality of source mappings, the plurality of PDF lines in association with the PEC line.

12. The method of claim 11, wherein the plurality of PDF lines are respectively associated with a plurality of PDF modules, and wherein the PEC module is generated by a compiler or translator in view of the plurality of PDF modules.

13. The method of claim 11, wherein each respective PDF line is associated with a respective line number in a respective PDF module identified by the respective PDF module name, wherein each respective line number and each respective PDF module name are provided by a compiler or translator.

14. The method of claim 11, wherein each of the retrieved source mappings includes a respective PEC line number, a respective PDF module name, and a respective line number of a respective PDF line, the method further comprising:

receiving, by a debugger tool, a request to present the PEC line in a user interface;

presenting a portion of a PEC file in a PEC area of the user interface, wherein the portion of the PEC file includes the PEC line; and presenting one or more PDF areas in the user interface, wherein each PDF area corresponds to one of the retrieved source mappings and comprises a respective portion of a respective PDF module identified by the respective PDF module name, wherein the respective portion of the respective PDF module comprises at least the respective PDF line identified by the respective line number.

15. The method of claim 14, wherein the request to present the PEC line is received in response to a command to display a portion of the PEC module that includes the PEC line in the user interface.

16. A non-transitory machine-readable storage medium storing instructions that cause a processing device to perform operations comprising:

identifying a plurality of pipeline definition file (PDF) lines from which a pipeline entity code (PEC) line of a PEC module is generated;

generating a plurality of source mappings for the PEC line, wherein each respective source mapping:

corresponds to a respective PDF line from which the PEC line is generated; and associates the PEC line with the respective PDF line and a respective PDF module name of the respective PDF line; and storing, in a data store, the plurality of source mappings in association with a name of the PEC module;

executing a pipeline program in a debugging session to debug the PEC module, wherein the pipeline program is compiled from the PEC module;

presenting the PEC line during executing the pipeline program in the debugging session;

retrieving, from the data store, the plurality of source mappings; and presenting, based on the plurality of source mappings, the plurality of PDF lines in association with the PEC line.

17. The non-transitory machine-readable storage medium of claim 16, wherein the plurality of PDF lines are respectively associated with a plurality of PDF modules, and wherein the PEC module is generated by a compiler or translator in view of the plurality of PDF modules.

18. The non-transitory machine-readable storage medium of claim 16, wherein each respective PDF line is associated with a respective line number in a respective PDF module identified by the respective PDF module name, wherein each respective line number and each respective PDF module name are provided by a compiler or translator.

19. The non-transitory machine-readable storage medium of claim 16, wherein each of the retrieved source mappings includes a respective PEC line number, a respective PDF module name, and a respective line number of a respective PDF line, the operations further comprising:

receiving, by a debugger tool, a request to present the PEC line in a user interface;

presenting a portion of a PEC file in a PEC area of the user interface, wherein the portion of the PEC file includes the PEC line; and presenting one or more PDF areas in the user interface, wherein each PDF area corresponds to one of the retrieved source mappings and comprises a respective portion of a respective PDF module identified by the respective PDF module name, wherein the respective portion of the respective PDF module comprises at least the respective PDF line identified by the respective line number.

20. The non-transitory machine-readable storage medium of claim 19, wherein the request to present the PEC line is received in response to a command to display a portion of the PEC module that includes the PEC line in the user interface.

* * * * *